US012700820B2

(12) United States Patent
Zhu et al.

(10) Patent No.: US 12,700,820 B2
(45) Date of Patent: Aug. 4, 2026

(54) POWER TOOL AND CONTROL METHOD THEREOF

(71) Applicant: Nanjing Chervon Industry Co., Ltd., Nanjing (CN)

(72) Inventors: Hong Zhu, Nanjing (CN); Pengchen Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 240 days.

(21) Appl. No.: 18/489,371

(22) Filed: Oct. 18, 2023

(65) Prior Publication Data

US 2024/0072715 A1     Feb. 29, 2024

Related U.S. Application Data

(63) Continuation of application No. PCT/CN2022/081177, filed on Mar. 16, 2022.

(30) Foreign Application Priority Data

May 12, 2021    (CN) .......................... 202110518929.3
May 12, 2021    (CN) .......................... 202110519047.9
(Continued)

(51) Int. Cl.
    H02P 29/024        (2016.01)
    B25F 5/00          (2006.01)
(52) U.S. Cl.
    CPC .............. H02P 29/027 (2013.01); B25F 5/00 (2013.01)
(58) Field of Classification Search
    CPC .... H02P 6/28; H02P 7/29; H02P 27/08; H02P 29/027; H02M 7/5395
    See application file for complete search history.

(56) References Cited

U.S. PATENT DOCUMENTS

2008/0238370 A1    10/2008   Carrier et al.
2016/0020443 A1*    1/2016   White ..................... H02P 25/14
                                                         318/245
(Continued)

FOREIGN PATENT DOCUMENTS

CN        102612224  A     7/2012
CN        104302028  A     1/2015
CN        112403405  A     2/2021

OTHER PUBLICATIONS

ISA/CN, International Search Report issued on PCT application No. PCT/CN2022/081177, dated May 24, 2022, 4 pages.
(Continued)

*Primary Examiner* — Said Bouziane
(74) *Attorney, Agent, or Firm* — Greenberg Traurig, LLP

(57) ABSTRACT

A power tool includes a housing, an electric motor, a driver circuit, a control module, and a current detection module. The control module is configured to: acquire a phase current value of the electric motor in real time within periodic time intervals; and turn off an on-state electronic switch within remaining time of a present time interval when the acquired phase current value exceeds a preset current threshold, and turn on an electronic switch which is controlled by the control module at present to be on when a present period of the drive signal ends, where the duration of each time interval among the periodic time intervals is the same as a period corresponding to the drive signal at present, and a period of the drive signal varies randomly within a second preset period range.

15 Claims, 16 Drawing Sheets

(30)        Foreign Application Priority Data

May 12, 2021    (CN) .......................... 202110525390.4
Sep. 6, 2021    (CN) .......................... 202111036354.8

(56)        References Cited

U.S. PATENT DOCUMENTS

2019/0337065 A1    11/2019  Yoshinari
2020/0162007 A1     5/2020  Sheeks

OTHER PUBLICATIONS

ISA/CN, English translation of International Search Report issued on PCT application No. PCT/CN2022/081177, dated May 24, 2022, 2 pages.
ISA/CN, Written Opinion issued on PCT application No. PCT/CN2022/081177, dated May 24, 2022, 3 pages.
ISA/CN, English translation of Written Opinion issued on PCT application No. PCT/CN2022/081177, dated May 24, 2022, 3 pages.

\* cited by examiner

14

10

11

15

12

25

23

21

24

27

27

PWM $I_{\text{phase}}$

POWER TOOL AND CONTROL METHOD THEREOF

RELATED APPLICATION INFORMATION

This application is a continuation of International Application Number PCT/CN2022/081177, filed on Mar. 16, 2022, through which this application also claims the benefit under 35 U.S.C. § 119(a) of Chinese Patent Application No. 202110525390.4, filed on May 12, 2021, Chinese Patent Application No. 202110518929.3, filed on May 12, 2021, Chinese Patent Application No. 202110519047.9, filed on May 12, 2021, and Chinese Patent Application No. 202111036354.8, filed on Sep. 6, 2021, which applications are incorporated herein by reference in their entireties.

TECHNICAL FIELD

The present application relates to a power tool and, in particular, to a control method applicable to an alternating current power tool.

BACKGROUND

Under a heavy load, since the power supply capability of a grid is sufficiently great, an alternating current power tool, especially for a high-voltage brushless tool, is prone to an overcurrent, which not only easily damages electronic components, but also significantly affects the feeling of using the power tool to a relatively large extent.

SUMMARY

In an example, a power tool includes: a housing; an electric motor disposed in the housing; a driver circuit including multiple electronic switches; a control module electrically connected to the driver circuit and outputting a drive signal to control the driver circuit to cause the electric motor to operate; and a current detection module configured to acquire a current value of the electric motor. The control module is further configured to: acquire a phase current value of the electric motor in real time through the current detection module within periodic time intervals; and turn off an on-state electronic switch within remaining time of a present time interval when the acquired phase current value exceeds a preset current threshold, and turn on an electronic switch which is controlled by the control module at present to be on when a present period of the drive signal ends, where the duration of each time interval among the periodic time intervals is the same as a period corresponding to the drive signal at present, and a period of the drive signal varies randomly within a second preset period range.

In some examples, the random variation of the period of the drive signal within the second preset period range follows the law of a normal distribution.

In some examples, the preset current threshold is not fixed and satisfies the variation law of a preset waveform.

In some examples, a period of the preset waveform is the same as the period of the drive signal or the duration of each time interval among the periodic time intervals.

In some examples, the preset waveform is set as a triangular waveform or a waveform including a curve.

In some examples, a preset current threshold corresponding to the end of the present time interval is less than a preset current threshold corresponding to the beginning of the present time interval.

In some examples, the power tool further includes a power supply input device and a rectifier module, where the power supply input device is configured to access a power supply required by the power tool when working, and the rectifier module is configured to be electrically connected to the power supply input device and convert electrical energy of the power supply input device into a direct current for the power tool to use.

In some examples, the power tool further includes a power supply circuit and a capacitor circuit, where the power supply circuit is electrically connected to the rectifier module to supply power to at least the control module, and the capacitor circuit is electrically connected between the rectifier module and the driver circuit.

In some examples, the capacitor circuit includes at least one electrolytic capacitor.

In some examples, the ratio of the capacitance value of the electrolytic capacitor to the rated power of the electric motor is higher than 20 μF/kW and lower than 80 μF/kW.

In some examples, the rectifier module includes a rectifier bridge constituted by four diodes D1, D2, D3, and D4.

In some examples, the current detection module is electrically connected between the control module and the electric motor and includes multiple current detection resistors.

In some examples, the electric motor is configured to be a brushless direct current motor.

In some examples, the brushless direct current motor is controlled by the drive signal.

In some examples, the power tool further includes a rotational speed detection module configured to acquire a rotational speed of the electric motor and a position of a rotor of the electric motor.

A power tool includes: a housing; an electric motor disposed in the housing; a driver circuit including multiple electronic switches; a control module electrically connected to the driver circuit and outputting a drive signal to control the driver circuit to cause the electric motor to operate; and a current detection module configured to acquire a current value of the electric motor. The control module is further configured to: acquire a phase current value of the electric motor in real time through the current detection module within periodic time intervals; and turn off an on-state electronic switch within remaining time of a present time interval when the acquired phase current value exceeds a preset current threshold, and turn on an electronic switch which is controlled by the control module at present to be on when a present period of the drive signal ends, where a period of the drive signal varies randomly within a second preset period range.

In some examples, the duration of each time interval among the periodic time intervals is the same as a period corresponding to the drive signal at present.

In some examples, the preset current threshold is not fixed and satisfies the variation law of a preset waveform.

A control method of a power tool is provided. The power tool includes: a housing; an electric motor disposed in the housing; a driver circuit including multiple electronic switches; a current detection module configured to acquire a current value of the electric motor; and a control module electrically connected to the driver circuit. The control method includes: outputting, by the control module, a drive signal to control the driver circuit to cause the electric motor to operate, and limiting, by the control module, a current of the electric motor within periodic time intervals; acquiring, by the control module, a phase current value of the electric motor in real time through the current detection module within the periodic time intervals; and turning off, by the control module, an on-state electronic switch within remaining time of a present time interval if the phase current value exceeds a preset current threshold, and turning on, by the control module, an electronic switch which is controlled by the control module at present to be on when a present period of the drive signal ends, where the duration of each time interval among the periodic time intervals is the same as a period corresponding to the drive signal at present, and a period of the drive signal varies randomly within a second preset period range.

In some examples, the random variation within the second preset period range follows the law of a normal distribution.

A large current of the power tool under a heavy load is effectively limited by the power tool and the control method thereof disclosed in this example. In addition, the period of the drive signal is set to vary randomly according to the law of the normal distribution within the preset range, and the electromagnetic interference (EMI) of the driver circuit is reduced through frequency jitter. Thus, the feeling of using the power tool is optimized to a relatively large extent, and the reliability and life of the power tool are improved.

A power tool includes: a housing; an electric motor disposed in the housing; a driver circuit including multiple electronic switches; a current detection module configured to acquire a phase current value of the electric motor; and a control module electrically connected to the driver circuit and outputting a drive signal to control the driver circuit to cause the electric motor to operate. The control module is further configured to: acquire the phase current value of the electric motor in real time through the current detection module within periodic time intervals; and turn off an on-state electronic switch within remaining time of a present time interval when the acquired phase current value exceeds a present current threshold, and turn on an electronic switch which is controlled by the control module at present to be on when a present period of the drive signal ends, where a current threshold is not fixed and satisfies the variation law of a preset waveform, and a period of the preset waveform is the same as the duration of each time interval among the periodic time intervals.

In some examples, the preset waveform is set as a triangular waveform or a waveform including a curve.

In some examples, a current threshold corresponding to the end of the present time interval is less than a current threshold corresponding to the beginning of the present time interval.

In some examples, the duration of each time interval among the periodic time intervals is the same as a period corresponding to the drive signal at present.

In some examples, the control module controls a period of the drive signal to vary continuously or randomly.

In some examples, the power tool further includes a power supply device and a rectifier module, where the power supply device is configured to access electrical energy of the power tool during work, and the rectifier module is electrically connected to the power supply device.

In some examples, the power tool further includes a power supply circuit and a capacitor circuit, where the power supply circuit is electrically connected to the rectifier module to supply power to at least the control module, and the capacitor circuit is electrically connected between the rectifier module and the driver circuit.

In some examples, the capacitor circuit includes at least one electrolytic capacitor.

In some examples, the current detection module includes multiple current detection resistors.

In some examples, the electric motor is configured to be a brushless direct current motor controlled by the drive signal.

A control method of a power tool is provided. The power tool includes: a housing; an electric motor disposed in the housing; a driver circuit including multiple electronic switches; a current detection module configured to acquire a current value of the electric motor; and a control module electrically connected to the driver circuit. The control method includes: outputting, by the control module, a drive signal to control the driver circuit to cause the electric motor to operate, and limiting, by the control module, a current of the electric motor within periodic time intervals; acquiring, by the control module, a phase current value of the electric motor in real time through the current detection module within the periodic time intervals; and turning off, by the control module, an on-state electronic switch within remaining time of a present time interval if the phase current value exceeds a present current threshold, and turning on, by the control module, an electronic switch which is controlled by the control module at present to be on when a present period of the drive signal ends, where a current threshold is not fixed and satisfies the variation law of a preset waveform, and a period of the preset waveform is the same as the duration of each time interval among the periodic time intervals.

In some examples, the preset waveform is a triangular waveform or a waveform including a curve within the periodic time intervals.

In some examples, a current threshold corresponding to the end of the present time interval is less than a current threshold corresponding to the beginning of the present time interval.

In some examples, the duration of each time interval among the periodic time intervals is the same as a period corresponding to the drive signal at present.

In some examples, the control module controls a period of the drive signal to vary continuously or randomly.

A large current of the power tool under a heavy load is effectively limited by the power tool and the control method thereof disclosed in this example. In addition, the period of the drive signal is optimized so that the effect of fluctuations in a grid voltage is reduced. Thus, the feeling of using the power tool is optimized to a relatively large extent, and the reliability and life of the power tool are improved.

A power tool includes: a housing; an electric motor disposed in the housing; a driver circuit including multiple electronic switches; a control module electrically connected to the driver circuit and outputting a drive signal to control the driver circuit to cause the electric motor to operate; and a current detection module configured to acquire a current value of the electric motor. The control module is further configured to: acquire a phase current value of the electric motor in real time through the current detection module within periodic time intervals; and turn off an on-state electronic switch within remaining time of a present time interval when the acquired phase current value exceeds a preset current threshold, and turn on an electronic switch which is controlled by the control module at present to be on when a present period of the drive signal ends, where the duration of each time interval among the periodic time intervals is the same as a period corresponding to the drive signal at present, and a period of the drive signal varies continuously within a first preset period range.

In some examples, the continuous variation is set as that the period of the drive signal keeps constant when a present grid voltage is lower than or equal to a present counter-electromotive force of the electric motor.

In some examples, the continuous variation is set as that the period of the drive signal varies continuously within the first preset period range when the present grid voltage is higher than a counter-electromotive force of the electric motor.

In some examples, the continuous variation satisfies the law of a sine function.

In some examples, the power tool further includes a power supply input device and a rectifier module, where the power supply input device is configured to access a power supply required by the power tool when working, and the rectifier module is configured to be electrically connected to the power supply input device and convert electrical energy of the power supply input device into a direct current for the power tool to use.

In some examples, the power tool further includes a power supply circuit and a capacitor circuit, where the power supply circuit is electrically connected to the rectifier module to supply power to at least the control module, and the capacitor circuit is electrically connected between the rectifier module and the driver circuit.

In some examples, the capacitor circuit includes at least one electrolytic capacitor.

In some examples, the current detection module includes multiple current detection resistors.

In some examples, the electric motor is configured to be a brushless direct current motor.

In some examples, the brushless direct current motor is controlled by the drive signal.

A large current of the power tool under a heavy load is effectively limited by the power tool and the control method thereof disclosed in this example. In addition, fluctuations in a grid voltage are effectively compensated. Thus, the feeling of using the power tool is optimized to a relatively large extent, and the reliability and life of the power tool are improved.

A power tool includes: a housing; an electric motor disposed in the housing; a driver circuit including multiple electronic switches; a current detection module configured to acquire a current value of the electric motor; and a control module electrically connected to the driver circuit, outputting a drive signal of a given period to control the driver circuit to cause the electric motor to operate, and acquiring a phase current value of the electric motor in real time through the current detection module. The control module is further configured to turn off an on-state electronic switch if the acquired phase current value is greater than a first preset current threshold, and turn on an electronic switch which is controlled by the control module at present to be on when the acquired phase current value is less than a second preset current threshold.

In some examples, the first preset current threshold is greater than the second preset current threshold.

In some examples, the power tool further includes a power supply input device and a rectifier module, where the power supply input device is configured to access a power supply required by the power tool when working, and the rectifier module is configured to be electrically connected to the power supply input device and convert electrical energy of the power supply input device into a direct current for the power tool to use.

In some examples, the power tool further includes a power supply circuit and a capacitor circuit, where the power supply circuit is electrically connected to the rectifier module to supply power to at least the control module, and the capacitor circuit is electrically connected between the rectifier module and the driver circuit.

In some examples, the capacitor circuit includes at least one electrolytic capacitor.

In some examples, the ratio of the capacitance value of the electrolytic capacitor to the rated power of the electric motor is higher than 20 µF/kW and lower than 80 µF/kW.

In some examples, the rectifier module includes a rectifier bridge constituted by four diodes D1, D2, D3, and D4.

In some examples, the current detection module is electrically connected between the control module and the electric motor and includes multiple current detection resistors.

In some examples, the electric motor is configured to be a brushless direct current motor.

In some examples, the brushless direct current motor is controlled by the drive signal.

DETAILED DESCRIPTION

Figure 1:
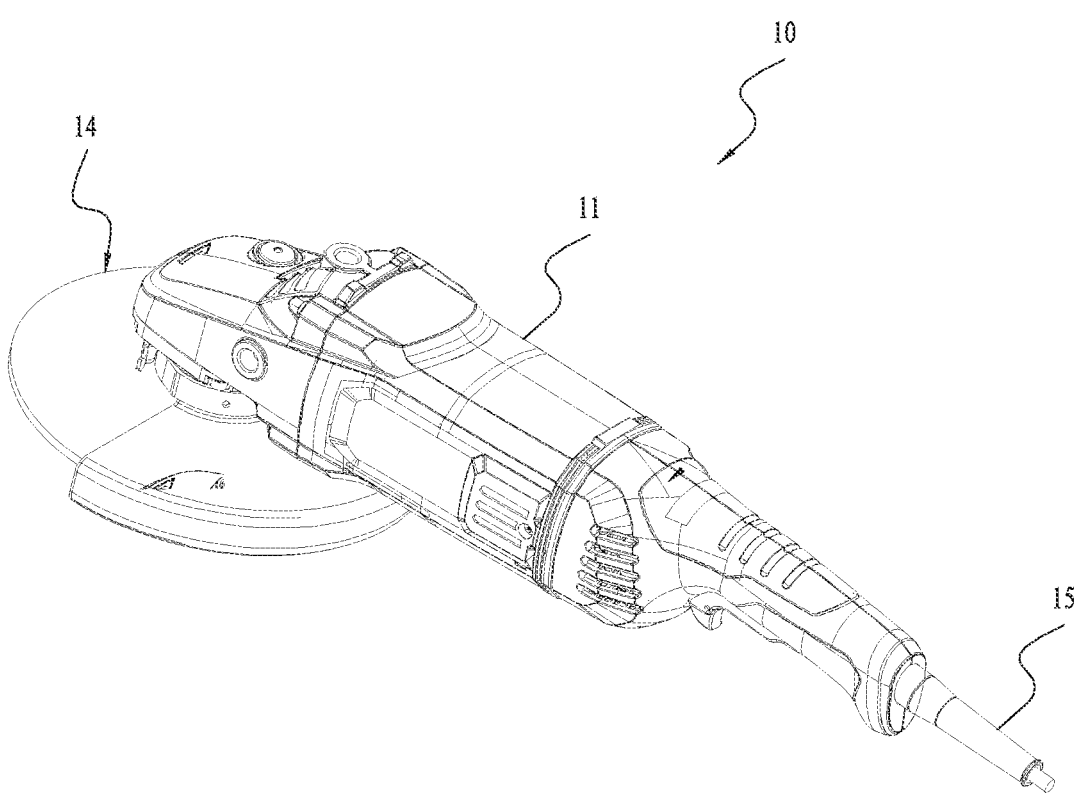
FIG. 1 is a perspective view of a power tool as an example.

The present application is described below in detail in conjunction with drawings and examples.

A power tool in the present application may be a handheld power tool, a garden tool, or a garden vehicle such as a vehicle-type mower, which is not limited here. The power tool in the present application includes, but is not limited to, alternating current power tools such as a sander, a drill bit, an impact driver, a tapper, and a fastener driver. As long as these power tools can adopt the essence of the technical solutions disclosed below, these power tools may fall within the scope of the present application. Additionally, it is to be noted that for ease of description, only part, not all, of structures related to the present application are illustrated in the drawings.

Referring to FIG. 1, a power tool 10 is shown exemplarily. The power tool is an angle grinder. The power tool 10 mainly includes a housing 11, an electric motor 13, a functional member 14, an alternating current power supply input device 15, and circuitry 12 disposed in the housing 11.

The electric motor 13 includes stator windings and a rotor. In some examples, the electric motor 13 is a three-phase brushless motor including the rotor with a permanent magnet and three-phase stator windings U, V, and W electronically commutated. In some examples, the three-phase stator windings U, V, and W adopt a star connection. In other examples, the three-phase stator windings U, V, and W adopt a delta connection. However, it must be understood that other types of brushless motors are also within the scope of the present disclosure. The brushless motor may include less or more than three phases.

The functional member 14 is used for implementing the function of the power tool 10. The functional member 14 is driven by the electric motor 13 to operate. For different power tools, functional elements are different. For the angle grinder, the functional member 14 is a grinding disc used for implementing a grinding or cutting function.

The alternating current power supply input device 15 is configured to access a power supply required by the power tool 10 to work. As an example, a power supply in this example is optionally configured to be an alternating current power supply. Specifically, the alternating current power supply input device 15 includes an alternating current plug to access alternating current mains of 120 V or 220 V.

Figures 2, 3:
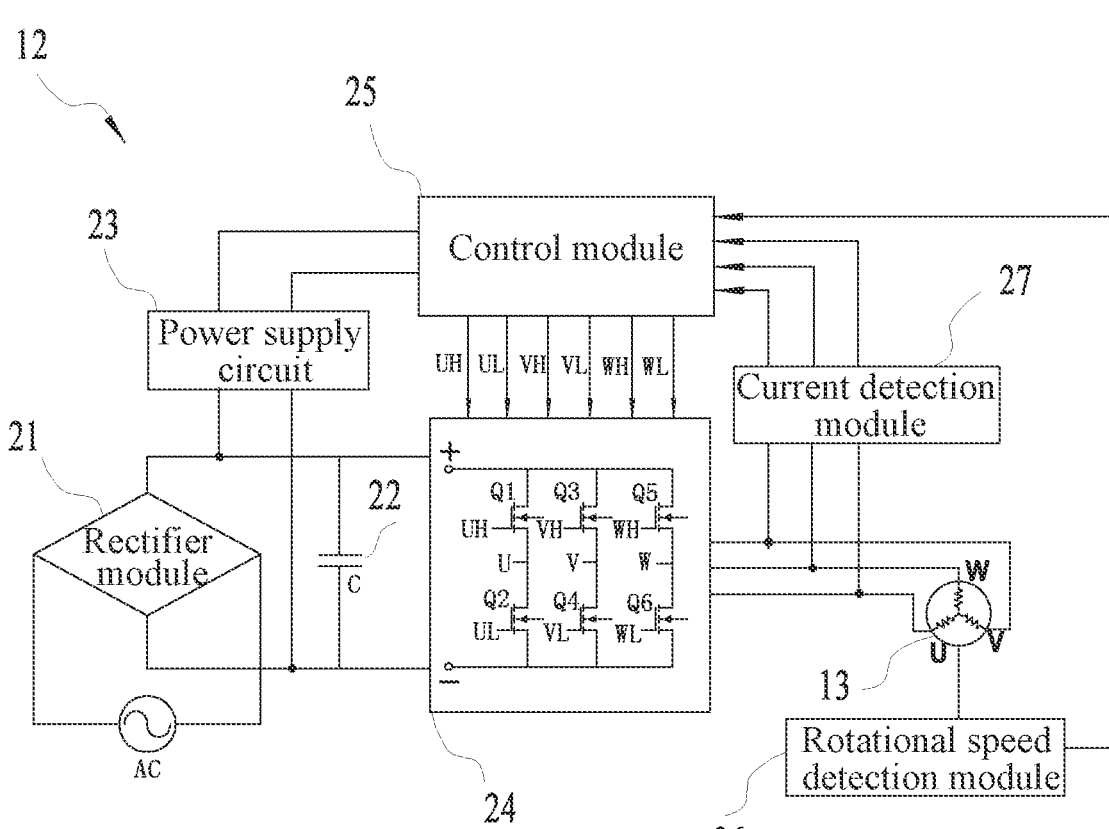
FIG. 2 is a circuit block diagram of circuitry as an example.
FIG. 3 is a circuit block diagram of a rectifier module as an example.

Referring to FIG. 2, the circuitry 12 of the power tool 10 as an example mainly includes a rectifier module 21, a capacitor circuit 22, a power supply circuit 23, a driver circuit 24, a control module 25, a rotational speed detection module 26, and a current detection module 27.

The rectifier module 21 constitutes a direct current unit of the power tool 10. The rectifier module 21 is configured to receive an alternating current from the alternating current power supply input device 15 and output a direct current bus voltage. That is, the rectifier module 21 is configured to convert the alternating current inputted by the alternating current power supply input device 15 into pulsating direct current output. The rectifier module 21 is electrically connected to the alternating current power supply input device 15. As an example, referring to FIG. 3, the rectifier module 21 includes a rectifier bridge constituted by four diodes D1, D2, D3, and D4, which converts the alternating current into the pulsating direct current output in the same direction with the unilateral conductivity and voltage drop of the diodes.

The capacitor circuit 22 is connected in parallel to a direct current bus of the power tool 10. That is, the capacitor circuit 22 is connected in parallel between the positive and negative electrodes of the direct current unit in the circuitry 12. As an example, the capacitor circuit 22 is optionally connected in parallel between the rectifier module 21 and the driver circuit 24. Specifically, the capacitor circuit 22 includes an electrolytic capacitor C. The capacitor circuit 22 is electrically connected to the rectifier module 21, and a pulsating direct current outputted by the rectifier module 21 is filtered and converted into smooth direct current output by the electrolytic capacitor C so that harmonic interference in the pulsating direct current is reduced. Optionally, the ratio of the capacitance value of the electrolytic capacitor C to the rated power of the electric motor 13 is higher than 20 μF/kW and lower than 80 μF/kW. In this manner, a space can be saved, and it is ensured that there is no physically large capacitive element in the hardware circuit.

The power supply circuit 23 is configured to supply power to at least the control module 25. As an example, the power supply circuit 23 is electrically connected to the rectifier module 21 and converts the electrical energy rectified by the rectifier module 21 into power supply voltage output adaptable to the control module 25. For example, to supply the power to the control module 25, the power supply circuit 23 reduces a voltage which is from the alternating current power supply input device 15 and is rectified by the rectifier module 21 to 15 V, so as to supply the power to the control module 25.

The driver circuit 24 is electrically connected to the rectifier module 21 and is configured to drive the electric motor 13. An input terminal of the driver circuit 24 receives the voltage from the rectifier module 21. Under the drive of the drive signal outputted by the control module 25, the voltage is distributed to each phase winding on the stator of the electric motor 13 in a certain logical relationship so that the electric motor 13 is started and generates continuous torque. Specifically, the driver circuit 24 includes multiple electronic switches. In some examples, an electronic switch includes a field-effect transistor (FET). In other examples, an electronic switch includes an insulated-gate bipolar transistor (IGBT) or the like. In some examples, the driver circuit 24 is a three-phase bridge circuit. The driver circuit 24 includes three electronic switches Q1, Q3, and Q5 configured as high-side switches and three electronic switches Q2, Q4, and Q6 configured as low-side switches.

The three electronic switches Q1, Q3, and Q5 as the high-side switches are disposed between a power supply line of the rectifier module 21 and phase coils of the electric motor 13 separately. The three electronic switches Q2, Q4, and Q6 as the low-side switches are disposed between the phase coils of the electric motor 13 and a ground line separately.

Gate terminals UH, UL, VH, VL, WH, and WL of the six electronic switches Q1 to Q6 are electrically connected to the control module 25, and each drain or source of each of the electronic switches is connected to the stator winding of the electric motor 13. The electronic switches Q1 to Q6 are turned on or off at a certain frequency according to drive signals outputted by the control module 25 to change the power state loaded by the rectifier module 21 on the winding of the electric motor 13.

The driver circuit 24 is a circuit for driving, by switching the power-on state of each phase winding of the electric motor 13 and controlling the power-on current of each phase winding, the electric motor 13 to rotate. The sequence in which phase windings are on and the time when each phase winding is on depend on the position of the rotor. To make the electric motor 13 rotate, the driver circuit 24 has multiple drive states. In a drive state, the stator winding of the electric motor 13 may generate a magnetic field, and the control module 25 outputs a control signal based on a different position of the rotor to control the driver circuit 24 to switch a drive state. In this manner, the magnetic field generated by the stator winding is rotated so that the rotor is driven to rotate, thereby driving the electric motor 13.

The rotational speed detection module 26 is configured to acquire at least one of a measured rotational speed of the electric motor 13 and the position of the rotor. In some examples, the rotational speed detection module 26 includes a sensor which can directly detect the speed and position of the electric motor 13, such as a Hall sensor. In other examples, the rotational speed detection module 26 is configured to estimate the position of the rotor of the electric motor 13 according to at least phase voltages of the electric motor 13 and current values of the stator windings.

Figure 4:
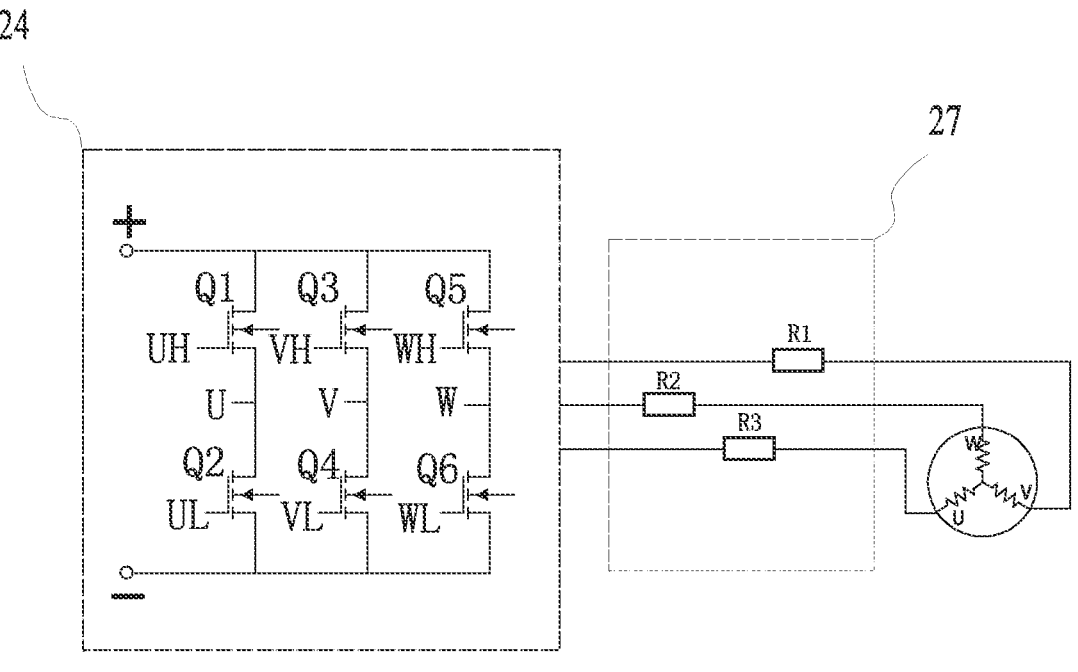
FIG. 4 is a circuit block diagram of a current detection module as an example.
Figure 5:
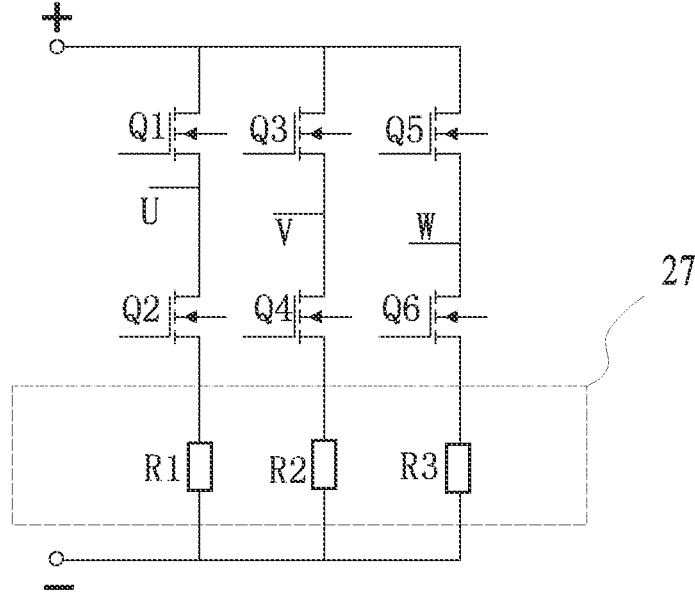
FIG. 5 is a circuit block diagram of a current detection module as another example.

The current detection module 27 is configured to collect a current of the electric motor 13, where the current may be a bus current of the electric motor 13 or a phase current of each phase winding of the electric motor 13. As an example, the current detection module 27 detects the phase current of each phase winding of the electric motor 13, and the bus current of the electric motor 13 may be calculated from the detected three-phase current values. In some examples, the current detection module 27 includes a Hall current sensor for directly detecting the phase current of each phase winding of the electric motor 13. As another example, referring to FIG. 4, current detection resistors R1, R2, and R3 are separately connected in series between the driver circuit 24 and the phase windings of the electric motor 13, and the current detection module 27 may calculate the phase current of each phase winding or the bus current by detecting voltages across the detection resistors. Specifically, the current detection module 27 may calculate phase currents of the three-phase stator windings U, V, and W by detecting the voltages across the current detection resistors R1, R2, and R3 separately. As another example, referring to FIG. 5, the current detection module 27 is configured to detect the internal resistance of an electronic switch in the on state in the driver circuit 24 and calculate, based on the internal resistance of the electronic switch in the on state and a voltage value across the electronic switch, the current flowing through the electronic switch, where the current of the electronic switch is a phase current of the corresponding winding of the electric motor 13. Specifically, the current detection module 27 separately detects a voltage across each of the three drive switches Q1, Q3, and Q5 as the high-side switches and calculates the phase currents of the corresponding three-phase stator windings U, V, and W. In this manner, the power tool can detect the phase currents of the corresponding windings of the electric motor 13 without additional hardware, thereby saving a cost.

The control module 25 is electrically connected to at least the power supply circuit 23, the driver circuit 24, and the current detection module 27 and is configured to control the driver circuit 24 to work. In some examples, the control module 25 may be a dedicated control chip (such as a microcontroller unit (MCU)).

A first example of the present application will be described next.

Figure 6:
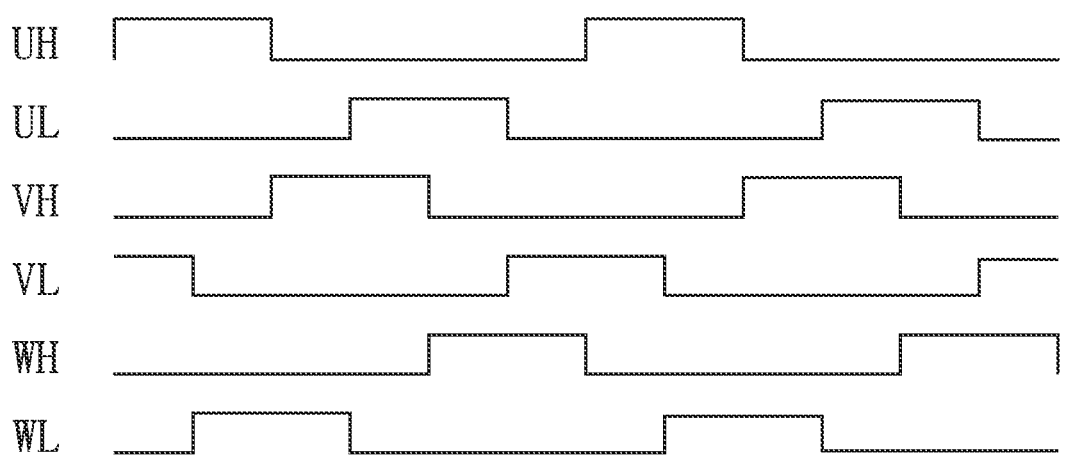
FIG. 6 is a diagram showing waveforms of control signals of an electric motor.
Figure 7:
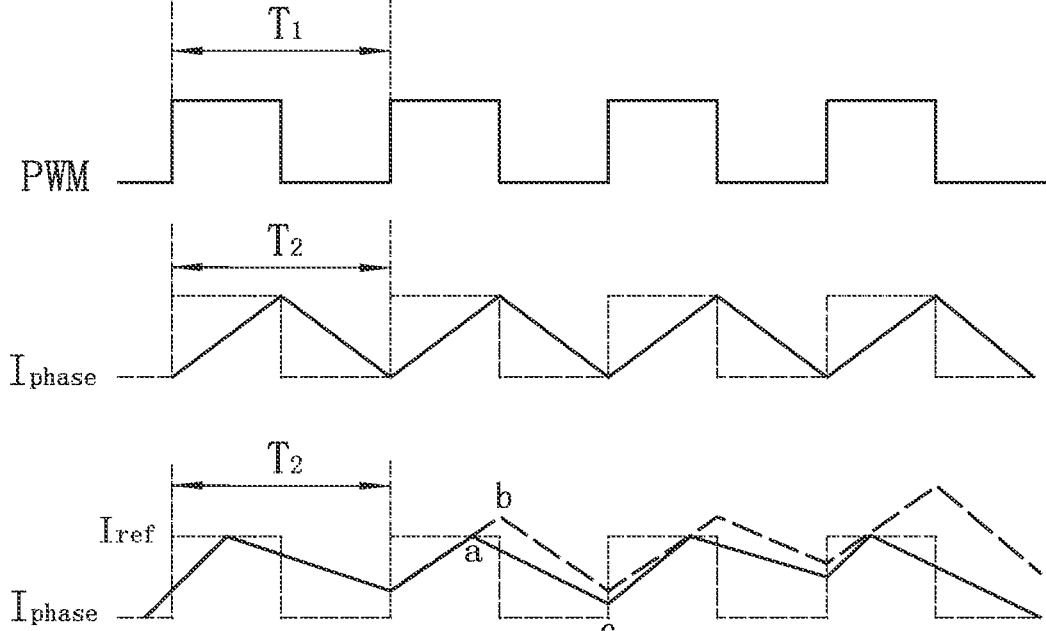
FIG. 7 is a waveform diagram showing a control method for limiting a current of an electric motor.

Referring to FIGS. 6 and 7, the control module 25 outputs the drive signals, and the drive signals are separately applied to the gate terminals UH, UL, VH, VL, WH, and WL of the six electronic switches Q1 to Q6 and are used for controlling the conduction states of the multiple electronic switches Q1 to Q6 so that the electric motor 13 is driven. The electric motor 13 is configured to be a three-phase brushless direct current motor, and a drive signal is configured to be a PWM signal. A period of the PWM signal is denoted by $T_1$, and the control module 25 limits the current of the electric motor within periodic time intervals $T_2$. A periodic time interval here may be understood as a current limiting period of the electric motor, and $T_2$ is defined as the current limiting period of the electric motor below.

Referring to FIG. 7, the current limiting period $T_2$ is set to be the same as the period $T_1$ of the PWM signal. The control module 25 is configured to acquire a phase current value $I_{phase}$ of the electric motor 13 in real time through the current detection module 27 within a present period among the current limiting periods $T_2$ and compare the phase current value $I_{phase}$ with a preset current threshold $I_{ref}$. If the phase current value $I_{phase}$ exceeds the preset current threshold $I_{ref}$, an electronic switch is turned off within remaining time of the present period among the current limiting periods $T_2$ so that the current flowing towards the electric motor 13 is off, and an electronic switch is turned on when a present period $T_1$ of the PWM signal ends so that the current flowing towards the electric motor 13 is restored. In this example, the preset current threshold $I_{ref}$ may be set otherwise according to the type of the electric motor in an actual application and an actual application scenario. It is to be further noted here that the electronic switch turned off in this example is specifically the electronic switch which is in the on state at present and the electronic switch turned on in this example is the electronic switch which is controlled by the drive signal at present to be turned on.

Under a heavy load, since the power supply capability of a grid voltage is sufficiently great, an overcurrent may occur in the electric motor. As a result, components in the power tool are damaged, and the service life of the power tool is reduced. Referring to FIG. 7, the overcurrent occurs in the electric motor under the heavy load, which is indicated by point b in FIG. 7. With the preceding technical solution for limiting the current, when the phase current value $I_{phase}$ exceeds the preset current threshold $I_{ref}$, the control module 25 turns off the electronic switch immediately so that the current flowing through the electric motor 13 will not increase, which is indicated by point a in the figure. When the present period of the PWM signal ends, the control module 25 turns on the electronic switch again so that the current flowing towards the electric motor 13 is restored, which is indicated by point c in the figure. In this example, the current detection module detects the phase current of the electric motor 13 so that the current of the electric motor is limited period by period. A bus current value of the electric motor may be detected so that the current of the electric motor is limited period by period.

Figure 8:
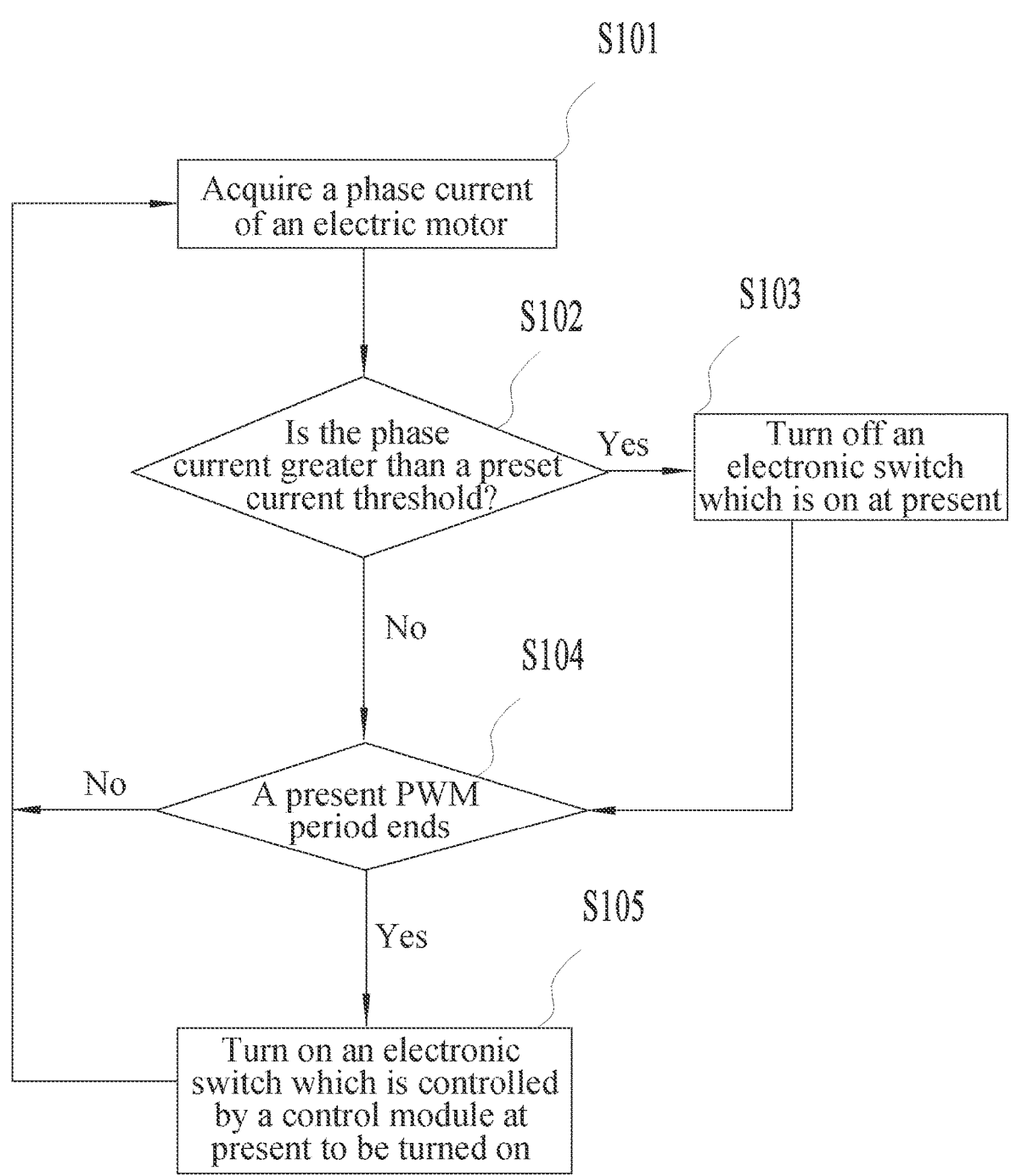
FIG. 8 is a flowchart of a control method for limiting a current of an electric motor.

A control method of the electric motor in the power tool 10 within one current limiting period will be described below in detail in conjunction with FIG. 8. The method includes the steps described below.

In S101, the phase current value of the electric motor is acquired.

In S102, it is determined whether the phase current value of the electric motor exceeds the preset current threshold. If yes, S103 is performed. If no, S104 is performed.

In S103, the electronic switch which is on at present is turned off.

In S104, it is determined whether the present current limiting period ends. If yes, S105 is performed. If no, S101 is performed.

In S105, the electronic switch which is controlled by the drive signal at present to be turned on is turned on. The flow returns to S101.

When the load of a grid increases or decreases significantly, the grid voltage may fluctuate, thereby affecting a user's feel.

Figure 9:
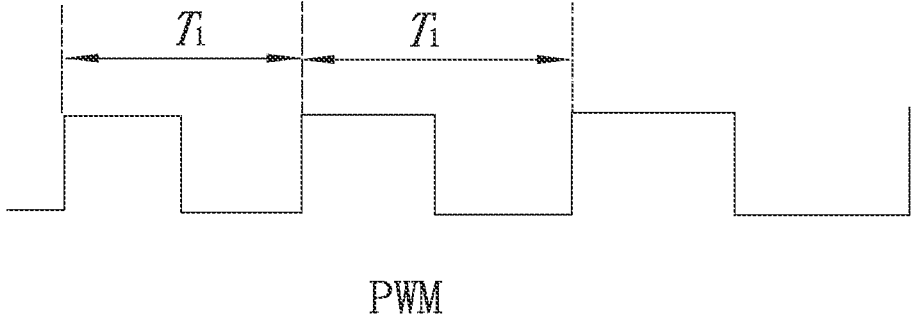
FIG. 9 is a diagram showing a waveform of a pulse-width modulation (PWM) signal and a waveform of a current limiting period as a first example.
Figure 9:
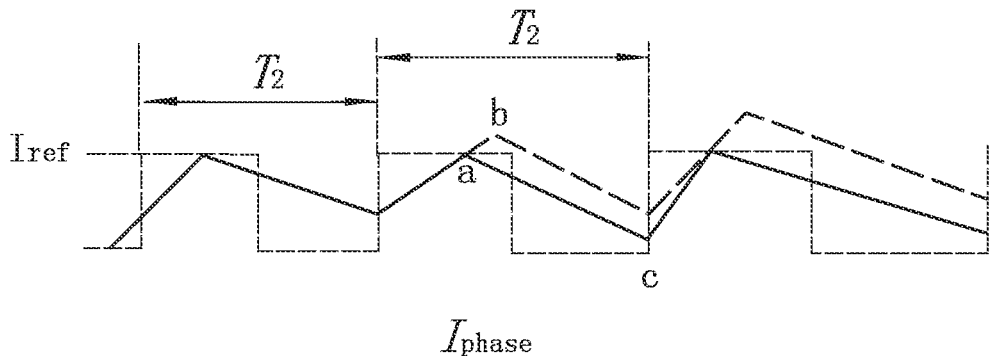
Figure 10:
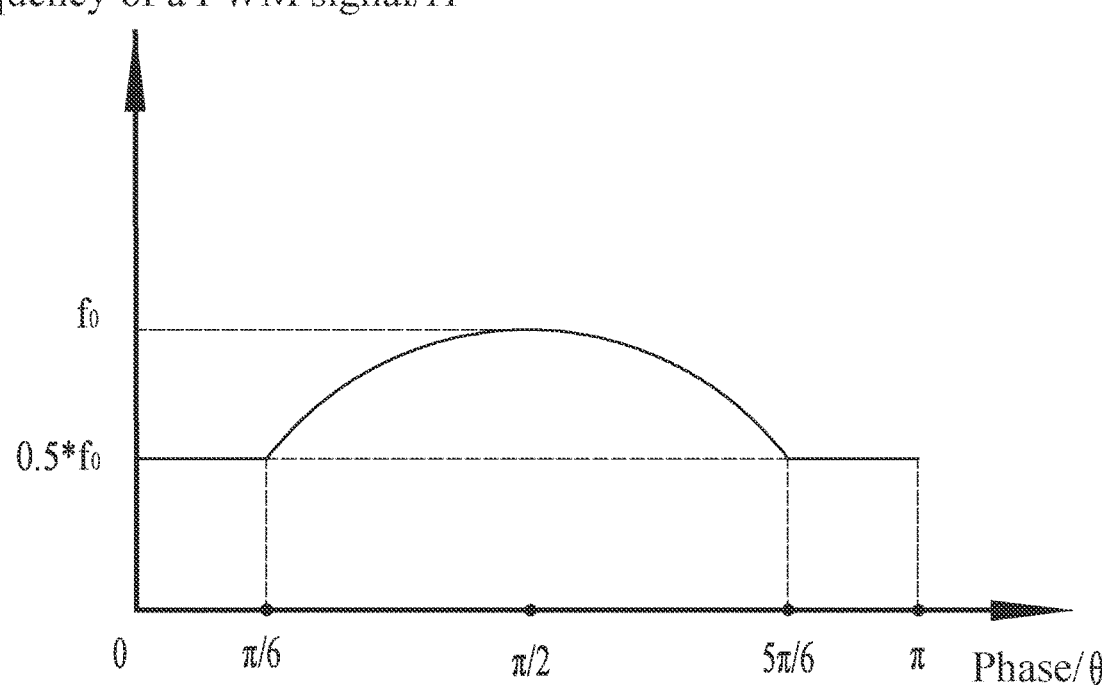
FIG. 10 is a waveform diagram showing the continuous variation of a frequency of a PWM signal as a first example.

As shown in FIG. 9, in this example, the control module 25 controls the period $T_1$ of the PWM signal for driving the electric motor 13 to vary continuously within a first preset period range, and the current limiting period $T_2$ of the electric motor 13 is set to be the same as the period $T_1$ of the PWM signal. The first preset period range is optionally set to $[0.5T_0, 2T_0]$, where $T_0$ denotes an initial period of the PWM signal. When the grid voltage is lower than or equal to a present counter-electromotive force of the electric motor 13, the period T1 of the PWM signal keeps constant. On the contrary, when the grid voltage is higher than the present counter-electromotive force of the electric motor 13, the period T1 of the PWM signal varies continuously within the first preset range. In conjunction with FIGS. 9 and 10, the continuous variation which the period $T_1$ of the drive signal is set to perform within the first preset period range may be obtained through the following formula:

$$\frac{1}{T_1} = f_1 = \begin{cases} 0.5 * f_0 & 0 \le \theta \le \frac{\pi}{6} \text{ or } \frac{5\pi}{6} \le \theta \le \pi \\ f_0 * \sin\theta & \frac{\pi}{6} < \theta < \frac{5\pi}{6} \end{cases} \quad (1)$$

where $f_0$ denotes an initial frequency corresponding to the initial period $T_0$ of the PWM signal, $f_1$ denotes a frequency corresponding to the period $T_1$ of the PWM signal, and $\theta$ denotes a phase of a present grid voltage.

Figure 11:
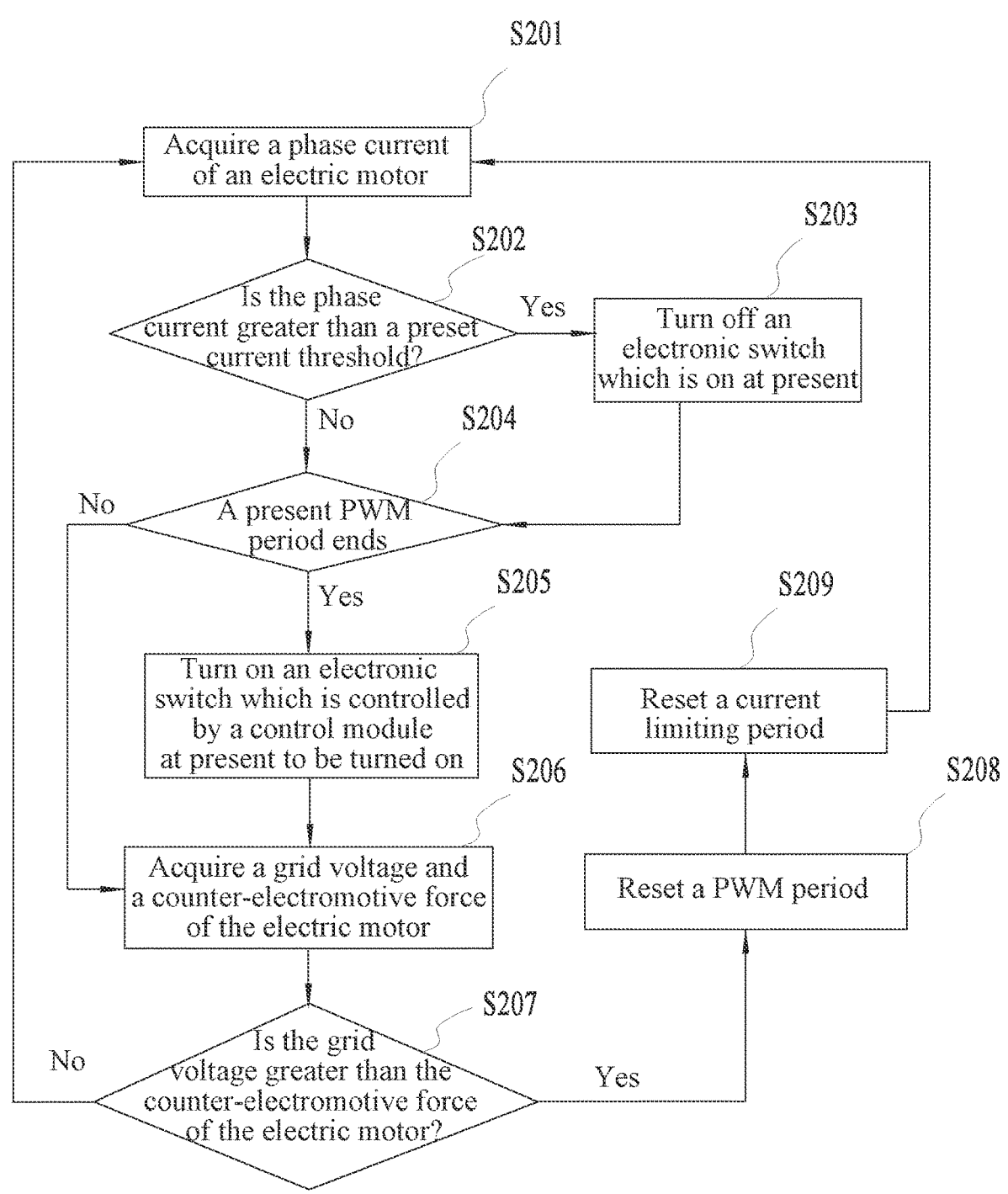
FIG. 11 is a flowchart of a control method of an electric motor as a first example.

A control method for limiting the current of the electric motor 13 in the power tool 10 period by period will be described below in detail in conjunction with FIG. 11. The method includes the steps described below.

In S201, the phase current value of the electric motor is acquired.

In S202, it is determined whether the phase current value of the electric motor exceeds the preset current threshold. If yes, S203 is performed. If no, S204 is performed.

In S203, the electronic switch which is on at present is turned off.

In S204, it is determined whether the present current limiting period ends. If yes, S205 is performed. If no, S206 is performed.

In S205, the electronic switch which is controlled by the drive signal at present to be turned on is turned on.

In S206, the grid voltage and the counter-electromotive force of the electric motor are acquired.

In S207, it is determined whether the grid voltage exceeds the present counter-electromotive force of the electric motor. If yes, S208 is performed. If no, S201 is performed.

In S208, the period $T_1$ of the drive signal is reset.

In S209, the current limiting period $T_2$ is reset. The flow returns to S201.

In the first example described above, the control method for limiting the current of the power tool period by period is disclosed, where the current limiting period is the same as the period of the PWM signal all the time, the electronic switch is turned off when the detected phase current of the electric motor is greater than the preset current threshold, and the electronic switch is turned on again and the phase current of the electric motor continues to be detected in real time when the present period of the PWM signal ends. In another aspect, the period of the PWM signal is set to vary continuously with the fluctuation of the grid voltage within the first preset period range, which can make effective compensations in accordance with the fluctuation of the grid voltage to improve the user's feel and the service life of the power tool.

A second example of the present application will be described next.

Figure 12:
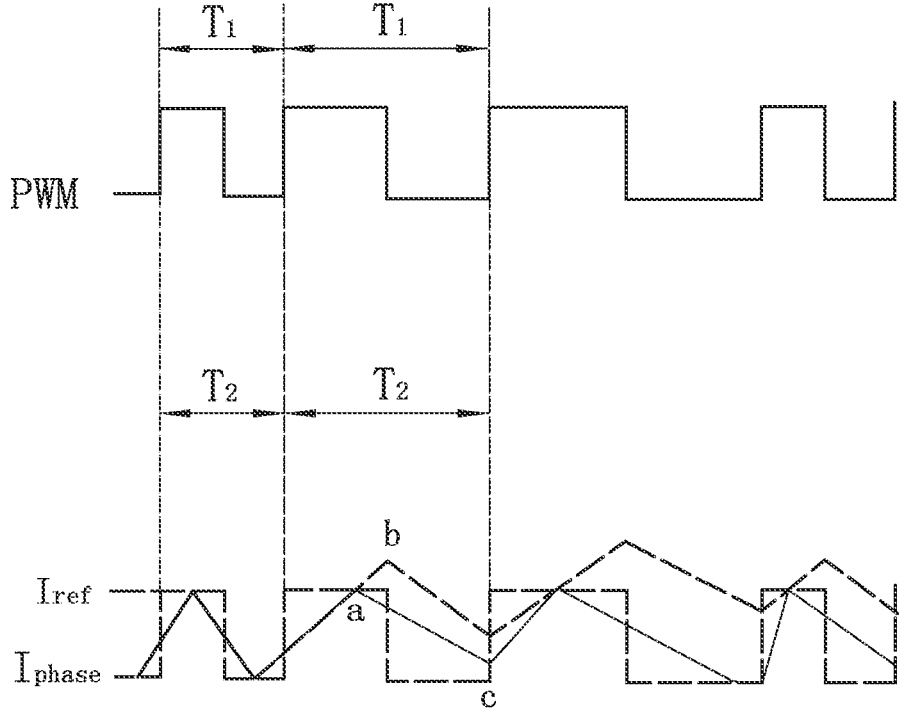
FIG. 12 is a diagram showing a waveform of a PWM signal and a waveform of a phase current of an electric motor as a second example.

The second example differs from the first example described above in that the control module 25 controls the period $T_1$ of the PWM signal for driving the electric motor 13 to vary randomly within a second preset period range, and the current limiting period $T_2$ of the electric motor 13 is set to be the same as the period $T_1$ of the PWM signal all the time. Referring to FIG. 12, the period $T_1$ of the PWM signal varies randomly within the second preset period range. Specifically, it may be set that the initial period $T_0$ of the PWM period superimposed with a white noise varies according to the law of a normal distribution. In this example, the initial period $T_0$ of the PWM signal for driving the electric motor 13 is set to 100 us, and the period $T_1$ of the PWM signal superimposed with the white noise varies randomly within the second preset period range [98 us, 102 us], and the variation satisfies the law of the normal distribution.

The overcurrent occurs in the electric motor under the heavy load, which is indicated by point b in FIG. 12. With the preceding technical solution for limiting the current, when the phase current value $I_{phase}$ exceeds the preset current threshold $I_{ref}$, the control module 25 turns off the electronic switch immediately so that the current flowing through the electric motor 13 will not increase, which is indicated by point a in the figure. When the present period of the PWM signal ends, the control module 25 turns on the electronic switch again so that the current flowing towards the electric motor 13 is restored, which is indicated by point c in the figure. In this example, the current detection module detects the phase current of the electric motor 13 so that the current of the electric motor is limited period by period. The bus current value of the electric motor may be detected so that the current of the electric motor is limited period by period.

It is to be noted that the second preset range set in this example should be set autonomously according to the actual application scenario of the power tool.

Figure 13:
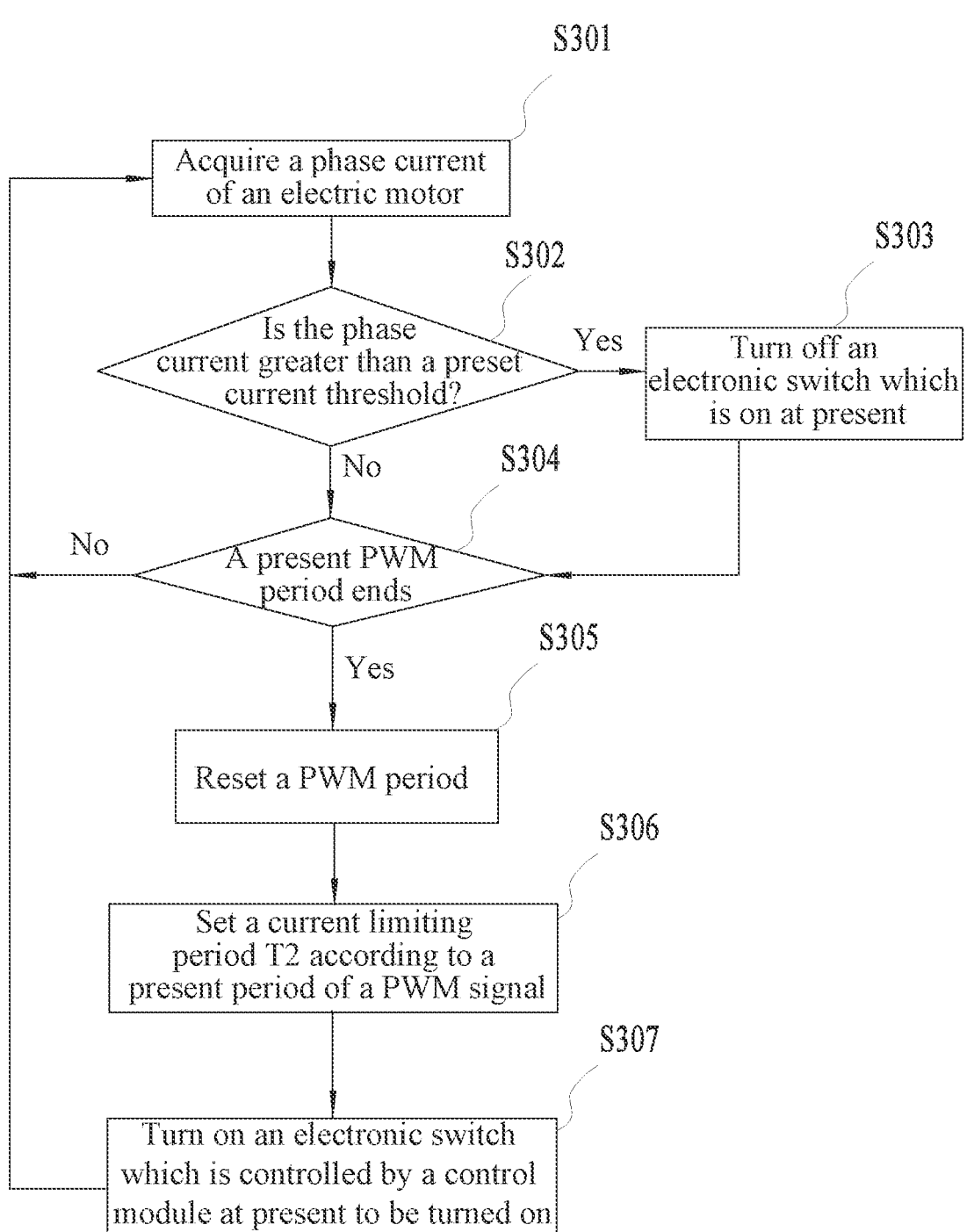
FIG. 13 is a flowchart of a control method of an electric motor as a second example.

A control method for limiting the current of the electric motor 13 in the power tool 10 period by period will be described below in detail in conjunction with FIG. 13. The method includes the steps described below.

In S301, the phase current value of the electric motor is acquired.

In S302, it is determined whether the phase current value of the electric motor exceeds the preset current threshold. If yes, S303 is performed. If no, S304 is performed.

In S303, the electronic switch which is on at present is turned off.

In S304, it is determined whether the present current limiting period ends. If yes, S305 is performed. If no, S301 is performed.

In S305, the period $T_1$ of the drive signal is reset.

In S306, the current limiting period $T_2$ is set according to the reset period $T_1$ of the drive signal.

In S307, the electronic switch which is controlled by the drive signal at present to be turned on is turned on. The flow returns to S301.

In the second example described above, the control method for limiting the current of the power tool period by period is disclosed, where the current limiting period is the same as the period of the PWM signal all the time, the electronic switch is turned off when the detected phase current of the electric motor is greater than the preset current threshold, and the electronic switch is turned on again and the phase current of the electric motor continues to be detected in real time when the present period of the PWM signal ends. In another aspect, the period of the PWM signal is set to vary randomly within the second preset period range. The preceding random variation satisfies the law of the normal distribution. In this example, the period of the PWM signal is set to vary randomly according to the law of the normal distribution within the preset range, and the EMI of the driver circuit is reduced through frequency jitter. Thus, the reliability of the power tool is improved.

A third example of the present application will be described next.

Figure 14:
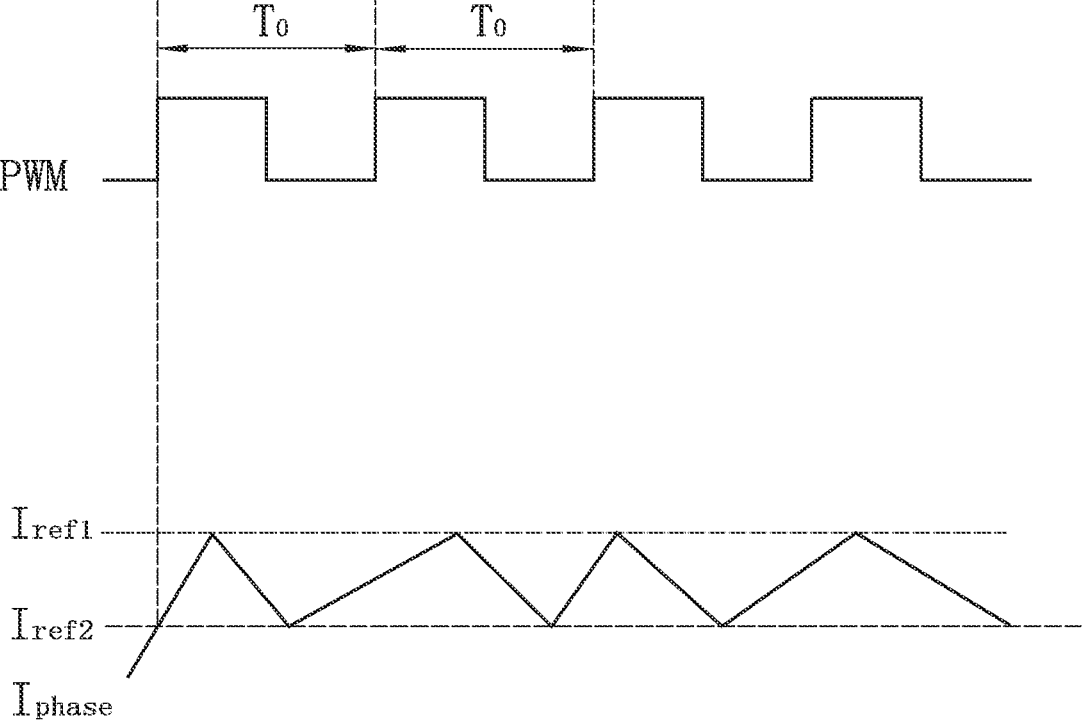
FIG. 14 is a diagram showing a waveform of a PWM signal and a waveform of a phase current of an electric motor as a third example.

The third example differs from the preceding example in that the control module 25 outputs the PWM signal having the initial period $T_0$ to control the driver circuit 24 to drive the electric motor 13 to operate, as shown in FIG. 14. The control module 25 acquires the phase current value of the electric motor 13 in real time through the current detection module 27 and compares the acquired phase current value with a preset current range. In this example, preset current thresholds include a first preset current threshold $I_{ref1}$ and a second preset current threshold $I_{ref2}$. The first preset current threshold $I_{ref1}$ is set as an upper limit, and the second preset current threshold $I_{ref2}$ is set as a lower limit. When the phase current value $I_{phase}$ of the electric motor 13 acquired by the control module 25 is greater than the first preset current threshold $I_{ref1}$, the control module 25 immediately turns off the electronic switch which is in the on state at present. When the phase current value $I_{phase}$ of the electric motor 13 acquired by the control module 25 is less than the second preset current threshold $I_{ref2}$, the control module 25 controls the electronic switch which is controlled by the drive signal at present to be turned on to be turned on. In a specific setting process, the difference between the first preset current threshold $I_{ref1}$ and the second preset current threshold $I_{ref2}$ is inversely proportional to an inductance value of the electric motor and is proportional to the counter-electromotive force of the electric motor in a normal working process. Those skilled in the art may rationally design the preset current range according to the type of the electric motor and the actual application scenario.

Figure 15:
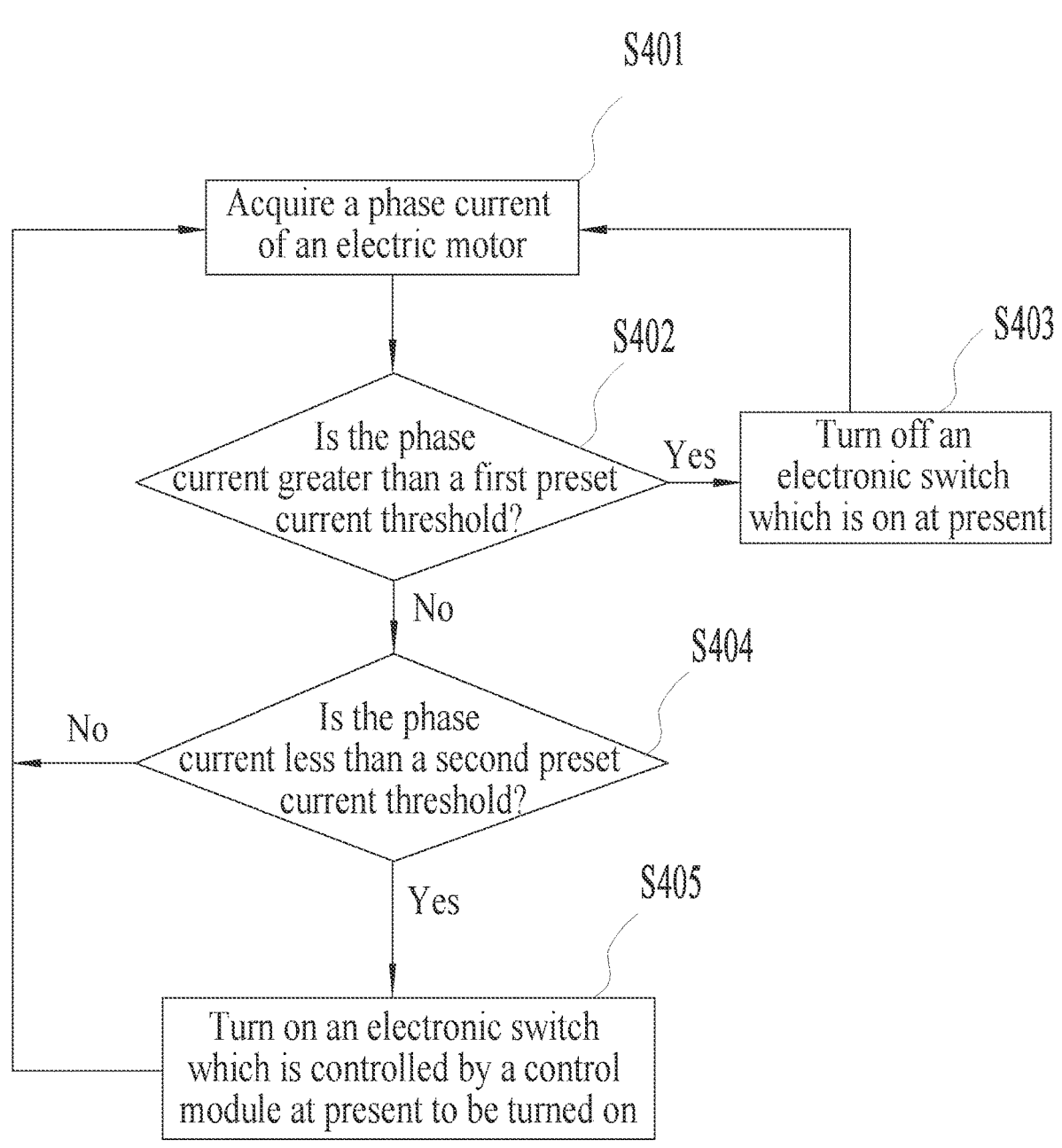
FIG. 15 is a flowchart of a control method of an electric motor as a third example.

A control method for limiting the current of the electric motor 13 in the power tool 10 period by period will be described below in detail in conjunction with FIG. 15. The method includes the steps described below.

In S401, the phase current value of the electric motor is acquired.

In S402, it is determined whether the phase current value of the electric motor is greater than the first preset current threshold. If yes, S403 is performed. If no, S404 is performed.

In S403, the electronic switch which is on at present is turned off.

In S404, it is determined whether the phase current value of the electric motor is less than the second preset current threshold. If yes, S405 is performed. If no, S401 is performed.

In S405, the electronic switch which is controlled by the drive signal at present to be turned on is turned on. The flow returns to S401.

In the third example described above, the control method for limiting the current of the power tool period by period is disclosed, where the phase current of the electric motor is acquired through the current detection module, the electronic switch is turned off once it is detected that the phase current exceeds the first preset current threshold, and the electronic switch is turned on and the current flowing towards the electric motor is restored once the phase current value of the electric motor is less than the second preset current threshold. A large current occurring during the work of the electric motor may be simply and effectively suppressed through the technical solution in the preceding example, and the feeling of using the power tool is not affected.

It is to be understood that in the first example and the second example described above, the preset current threshold is set so that no large current occurs in the electric motor, thereby protecting electronic components. However, due to the existence of the current limiting period in the first example and the second example described above, the current flowing through the electric motor may generate a second harmonic when the preset current threshold is a fixed value.

A fourth example of the present application will be described next.

Figure 16:
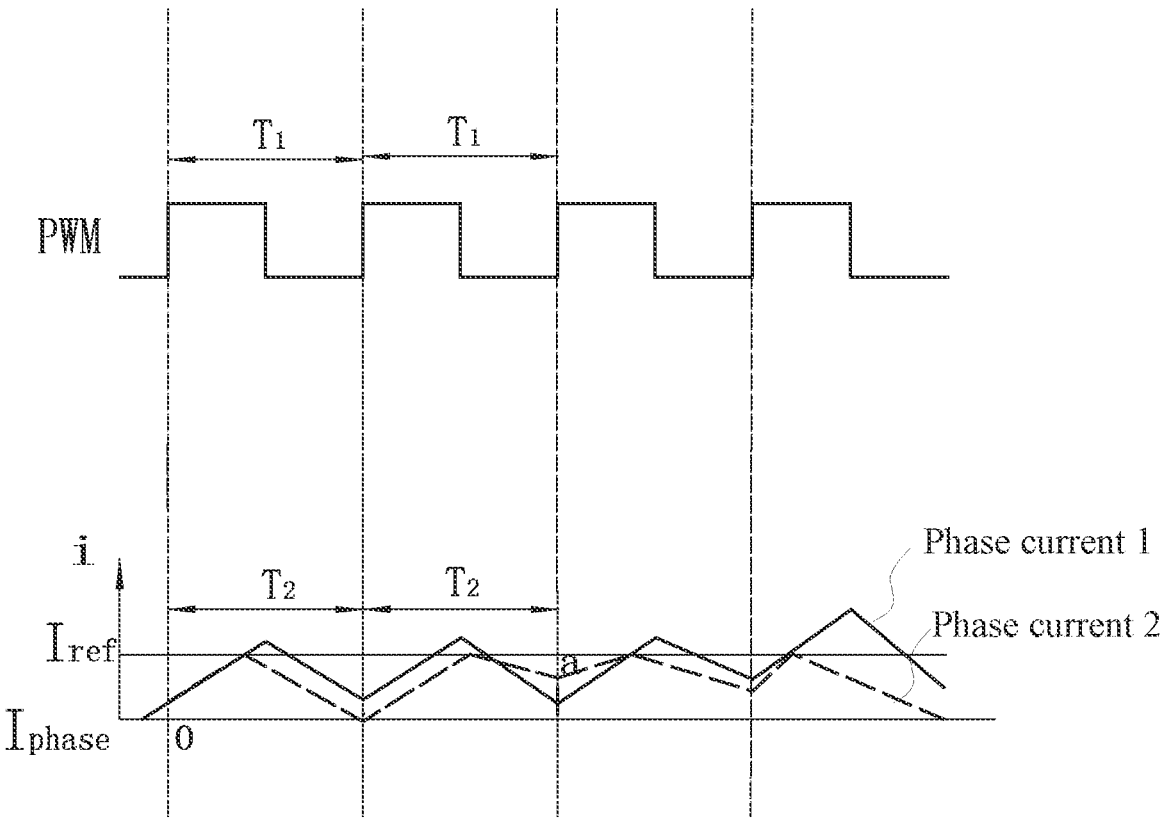
FIG. 16 is a diagram showing a waveform of a phase current of an electric motor when a preset current threshold is a fixed value.

Referring to FIG. 16, the preset current threshold $I_{ref}$ is optionally set as the fixed value, and the phase current acquired in real time is compared with the preset current threshold $I_{ref}$, where phase current 1 is the waveform of the phase current value $I_{phase}$ of the electric motor in a normal working state, and phase current 2 is the waveform of the phase current value Tome of the electric motor after the current is limited. When the phase current value Tome exceeds the preset current threshold $I_{ref}$, the electronic switch which is in the on state at present is turned off within the remaining time of the present period among the current limiting periods $T_2$ so that the current flowing towards the electric motor is off, and the electronic switch is turned on when the present period $T_1$ of the PWM signal ends so that the current flowing towards the electric motor is restored. According to the preceding current limiting method, the second harmonic indicated by point a in FIG. 16 will appear, which will affect the normal operation of the power tool.

In order that the problem in the first example and the second example described above is solved, the preset current threshold $I_{ref}$ in this example is not fixed and satisfies the variation law of a preset waveform.

Figure 17A:
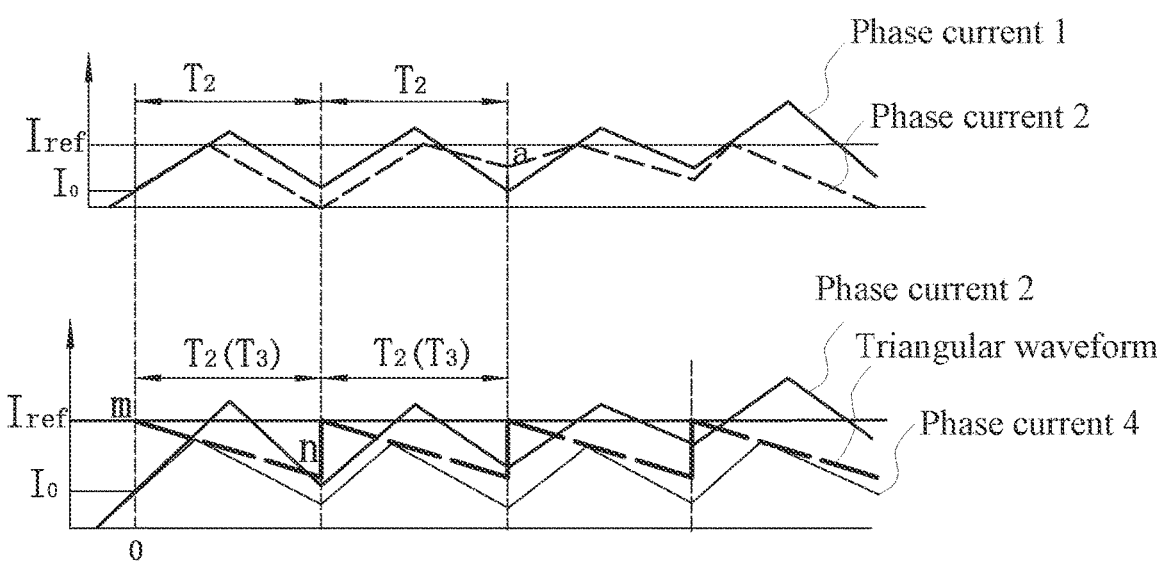
FIG. 17a is a diagram showing a waveform of a PWM signal and a waveform of a phase current of an electric motor as a fourth example.

Referring to FIG. 17a, the preset waveform is optionally set as a triangular waveform, and a period $T_3$ of the triangular waveform is the same as the current limiting period $T_2$. The slope K of the triangular waveform is in the following range:

$$\frac{I_{ref} - I_0}{T_3} \le K \le 0 \tag{2}$$

where $I_0$ denotes the phase current value at a power-on moment. It is to be understood that those skilled in the art may typically debug a specific circuit to set $I_{ref}$ to a value so that the relatively proper value is acquired. It is to be understood that the manner in which the range of K is calculated is provided in this example, but a value of K needs to be acquired by those skilled in the art by debugging the circuit within the preceding range of K.

Referring to FIG. 17a, phase current 1 is the waveform of the phase current of the electric motor whose current is not limited, phase current 2 is the waveform of the phase current of the electric motor when the preset current threshold $I_{ref}$ is the fixed value, and phase current 4 is the waveform of the phase current of the electric motor when the preset current threshold $I_{ref}$ has the triangular waveform. It may be clearly seen from FIG. 17a that no significant second harmonic is generated in the phase current of the electric motor in phase current 4.

Figure 17B:
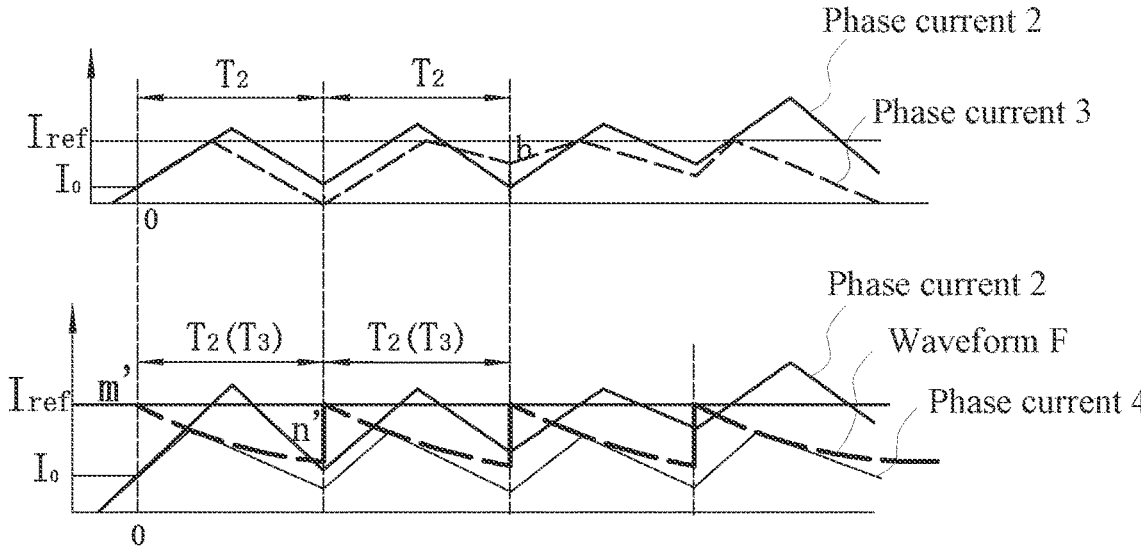
FIG. 17b is a diagram showing a waveform of a PWM signal and a waveform of a phase current of an electric motor as another implementation of a fourth example.

The preset waveform in this example is the triangular waveform. The preset waveform may be set as a waveform including a curve. Referring to FIG. 17b, the preceding waveform including the curve is defined as waveform F here, and a period $T_3$ of waveform F is the same as the current limiting period $T_2$. It is to be understood that the current value at the beginning of a current limiting period $T_2$ in waveform F is the same as the current value at the beginning of a current limiting period $T_2$ in the triangular waveform. Similarly, the current value at the end of a current limiting period $T_2$ in waveform F is the same as the current value at the end of a current limiting period $T_2$ in the triangular waveform. In other words, point m and point n in FIG. 17a correspond to point m' and point n' in FIG. 17b, respectively. Referring to FIG. 17b, phase current 2 is the waveform of the phase current of the electric motor when the preset current threshold $I_{ref}$ is the fixed value, and phase current 4 is the waveform of the phase current of the electric motor when the preset current threshold $I_{ref}$ has waveform F. It may be clearly seen from FIG. 17b that no significant second harmonic is generated in the phase current of the electric motor in phase current 4. A specific parameter of waveform F needs to be designed according to a specific circuit structure. It is to be further noted here that the preset waveform in the preceding example is not limited to the triangular waveform and the waveform including the curve described above. In the preset waveform, a current threshold corresponding to the end of the present current limiting period $T_2$ is less than a current threshold corresponding to the beginning of the present current limiting period $T_2$.

Figure 18:
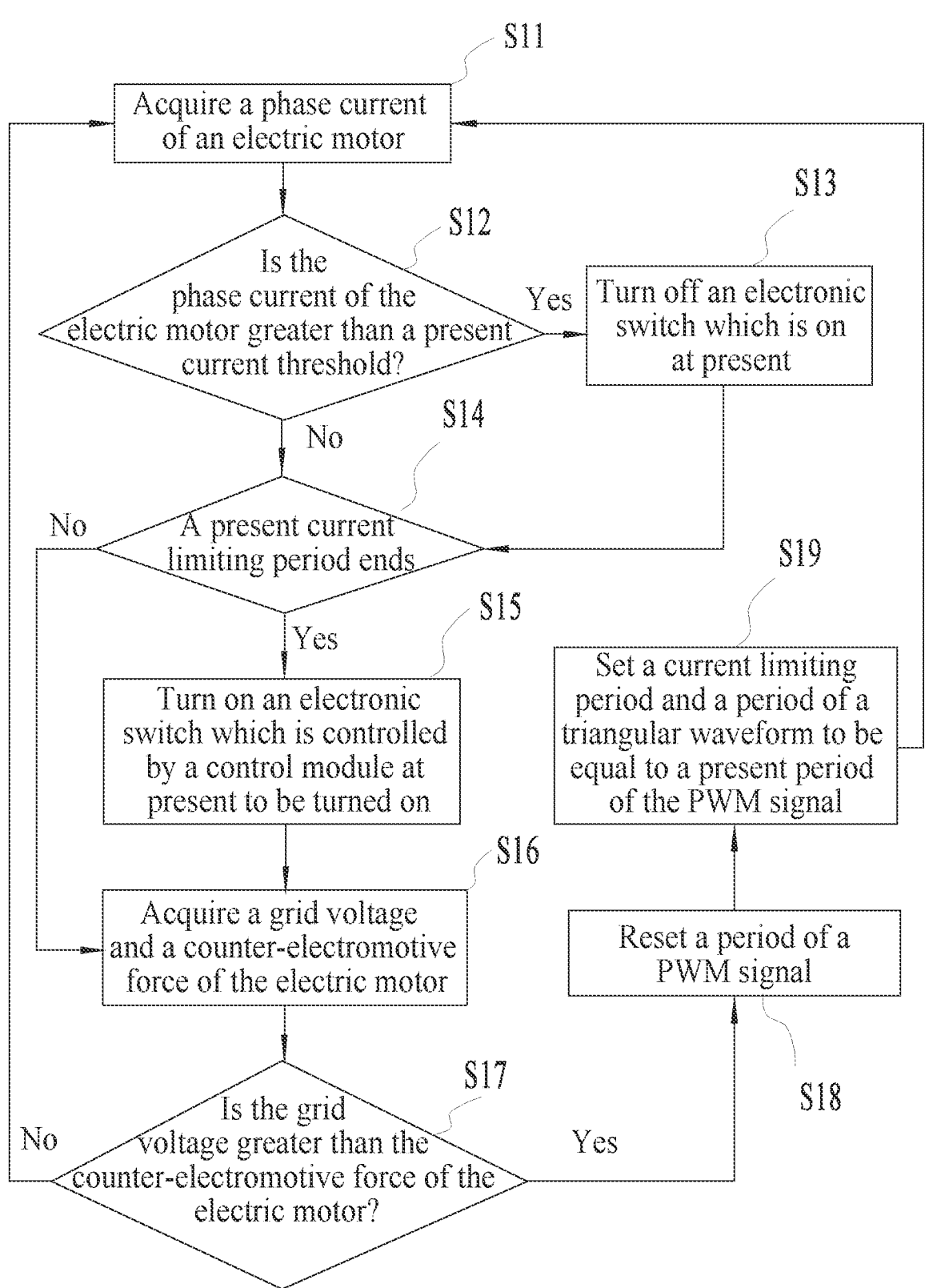
FIG. 18 is a flowchart of a control method of an electric motor as a fourth example.

In conjunction with FIG. 18, a control method for limiting the current period by period will be described next in detail through the example in which the preset waveform is the triangular waveform. The method includes the steps described below.

In S11, the phase current value of the electric motor is acquired.

In S12, it is determined whether the phase current value of the electric motor exceeds a present preset current threshold. If yes, S13 is performed. If no, S14 is performed.

In S13, the electronic switch which is on at present is turned off.

In S14, it is determined whether the present current limiting period ends. If yes, S15 is performed. If no, S16 is performed.

In S15, the electronic switch which is controlled by the PWM signal at present to be turned on is turned on.

In S16, the grid voltage and the counter-electromotive force of the electric motor are acquired.

In S17, it is determined whether the grid voltage exceeds the present counter-electromotive force of the electric motor. If yes, S18 is performed. If no, S11 is performed.

In S18, the period of the PWM signal is reset.

In S19, the current limiting period T and the period of the triangular waveform are set to be equal to the present period of the PWM signal. The flow returns to S11.

Figure 19:
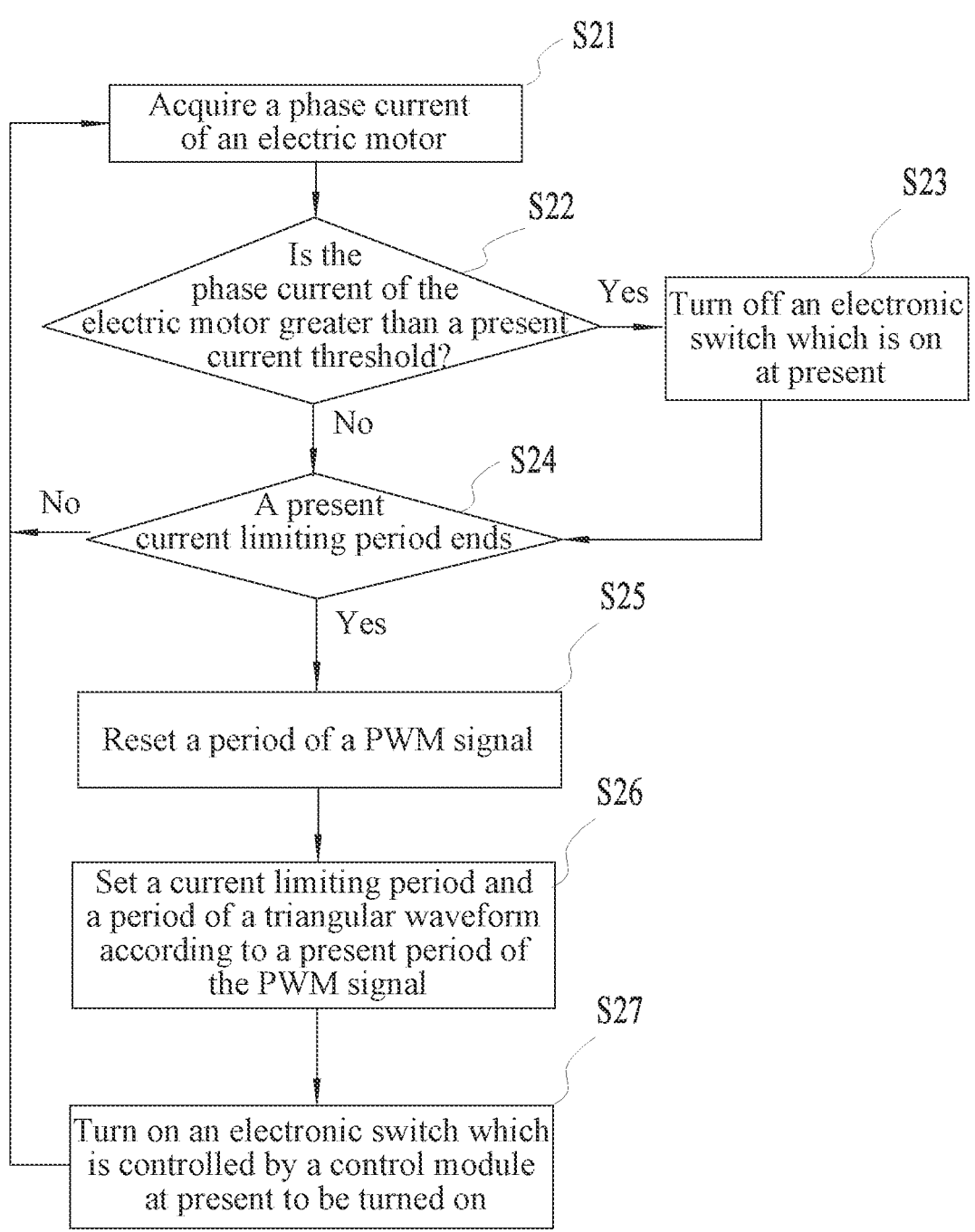
FIG. 19 is a flowchart of a control method of an electric motor as another implementation of a fourth example.

In conjunction with FIG. 19, a control method for limiting the current period by period will be described next in detail through the example in which the preset waveform is the triangular waveform. The method includes the steps described below.

In S21, the phase current value of the electric motor is acquired.

In S22, it is determined whether the phase current value of the electric motor exceeds a present current threshold. If yes, S23 is performed. If no, S24 is performed.

In S23, the electronic switch which is on at present is turned off.

In S24, it is determined whether the present current limiting period ends. If yes, S25 is performed. If no, S21 is performed.

In S25, the period of the PWM signal is reset.

In S26, the current limiting period and the period of the triangular waveform are set to be equal to the present period of the PWM signal.

In S27, the electronic switch which is controlled by the drive signal at present to be turned on is turned on. The flow returns to S21.

What is claimed is:

1. A power tool, comprising:
   a housing;
   an electric motor disposed in the housing;
   a current detection module configured to acquire a current value of the electric motor in real time;
   a driver circuit, comprising a plurality of electronic switches, selectively providing electrical signals to drive the electric motor; and
   a control module electrically connected to the driver circuit and configured to acquire a grid voltage of the electric motor, use the grid voltage to determine a time period for each of a series of drive signal time intervals, turn off an on-state electronic switch among the plurality of electronic switches within a remaining time period of each one of the series of drive signal time intervals when the current value acquired by the current detection module exceeds a preset current threshold, and turn on an electronic switch among the plurality of electronic switches which is controlled by the control module at present to be on when the time period of each one of the series of drive signal time intervals ends;
   wherein the determined time period for each of the series of drive signal time intervals is varied within a present period range when the grid voltage is higher than a present counter-electromotive force of the electric motor; the determined time period for each of the series of drive signal time intervals keeps constant when the grid voltage is lower than or equal to the present counter-electromotive force of the electric motor.

2. The power tool according to claim 1, wherein variations of the time periods associated with the series of drive signal time intervals follows a law of a normal distribution.

3. The power tool according to claim 1, wherein the preset current threshold has a value that follows a preset waveform.

4. The power tool according to claim 3, wherein a time period of the preset waveform is the same as the time period of each of the series of drive signal time intervals.

5. The power tool according to claim 4, wherein the preset waveform is set as a triangular waveform or a waveform comprising a curve.

6. The power tool according to claim 5, wherein the preset current threshold corresponding to an end of a first one of the series of drive signal time intervals is less than the preset current threshold corresponding to a beginning of the first one of the series of drive signal time i intervals.

7. The power tool according to claim 1, further comprising a power supply input device and a rectifier module, wherein the power supply input device is configured to access a power supply required by the power tool when working, and the rectifier module is configured to be electrically connected to the power supply input device and convert electrical energy of the power supply input device into a direct current for the power tool to use.

8. The power tool according to claim 7, further comprising a power supply circuit and a capacitor circuit, wherein the power supply circuit is electrically connected to the rectifier module to supply power to at least the control module, and the capacitor circuit is electrically connected between the rectifier module and the driver circuit.

9. The power tool according to claim 8, wherein the capacitor circuit comprises at least one electrolytic capacitor.

10. The power tool according to claim 9, wherein a ratio of a capacitance value of the electrolytic capacitor to rated power of the electric motor is higher than 20 μF/kW and lower than 80 μF/kW.

11. The power tool according to claim 10, wherein the rectifier module comprises a rectifier bridge constituted by four diodes D1, D2, D3, and D4.

12. The power tool according to claim 11, wherein the current detection module is electrically connected between the control module and the electric motor and comprises a plurality of current detection resistors.

13. The power tool according to claim 1, wherein the electric motor is configured to be a brushless direct current motor.

14. The power tool according to claim 1, further comprising a rotational speed detection module configured to acquire a rotational speed of the electric motor and a position of a rotor of the electric motor.

15. A control method of a power tool comprising a housing, an electric motor disposed in the housing, a driver circuit comprising a plurality of electronic switches, a current detection module configured to acquire a current value of the electric motor, and a control module electrically connected to the driver circuit, the control method comprising:

outputting, by the control module, a drive signal to control the driver circuit to cause the electric motor to operate;

limiting, by the control module, a current of the electric motor within periodic time intervals;

acquiring, by the control module, a current value of the electric motor in real time through the current detection module within the periodic time intervals;

turning off, by the control module, an on-state electronic switch among the plurality of electronic switches within a remaining time of a present time interval when the current value exceeds a preset current threshold; and turning on, by the control module, an electronic switch among the plurality of electronic switches which is controlled by the control module at present to be on when a present period of the drive signal ends;

wherein a duration of each time interval among the periodic time intervals is the same as a period corresponding to the drive signal at present and a period of the drive signal is determined by the controller by comparing a grid voltage of the electric motor to a present counter-electromotive force of the electric motor.

* * * * *